(12) United States Patent
Matsuo et al.

(10) Patent No.: US 9,677,500 B2
(45) Date of Patent: Jun. 13, 2017

(54) STEEL PISTON WITH COUNTER-BORE DESIGN

(71) Applicant: FEDERAL-MOGUL CORPORATION, Southfield, MI (US)

(72) Inventors: Eduardo Matsuo, Ann Arbor, MI (US); Airton Martins, Granger, IN (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 15/073,988

(22) Filed: Mar. 18, 2016

(65) Prior Publication Data

US 2016/0199952 A1 Jul. 14, 2016

Related U.S. Application Data

(62) Division of application No. 14/030,530, filed on Sep. 18, 2013, now Pat. No. 9,291,120.

(60) Provisional application No. 61/702,549, filed on Sep. 18, 2012.

(51) Int. Cl.
*F02F 3/26* (2006.01)
*F02F 3/00* (2006.01)
*B23P 15/10* (2006.01)

(52) U.S. Cl.
CPC .............. *F02F 3/0015* (2013.01); *B23P 15/10* (2013.01); *F02F 3/00* (2013.01); *F02F 3/0084* (2013.01); *F02F 3/0092* (2013.01); *F02F 2003/0007* (2013.01); *F02F 2200/00* (2013.01); *F05C 2201/0448* (2013.01); *Y10T 29/49249* (2015.01)

(58) Field of Classification Search
CPC .......... F02F 3/0015; F02F 3/0092; F02F 3/00; F02F 3/0084; F02F 2200/00; F02F 2003/0007; B23P 15/10; Y10T 29/29249
USPC ..................... 123/193.6; 29/888.04, 888.048
See application file for complete search history.

(56) References Cited

U.S. PATENT DOCUMENTS 5,054,375 A * 10/1991 Kawabata ............... F02F 3/022
                                                                 123/193.6
5,388,632 A *  2/1995 Bayliss ..................... B22C 9/06
                                                                   164/122
5,894,824 A *  4/1999 Watanabe ............... F02F 3/022
                                                                 123/193.6

(Continued)

FOREIGN PATENT DOCUMENTS

CN          1545597 A      11/2004
CN          1596335 A       3/2005

(Continued)

*Primary Examiner* — Marguerite McMahon
(74) *Attorney, Agent, or Firm* — Robert L. Stearns; Dickinson Wright, PLLC

(57) ABSTRACT

A piston for an internal combustion engine is provided. The piston includes a piston body which is made of steel. The piston body has a crown portion with an upper combustion surface, a pair of skirts which depend from the crown surface, a pair of pin bosses for receiving a wrist pin and a plurality of pin boss bridges which extend from the pin bosses to the skirts. Each of the pin boss bridges extends axially to a lower end which is opposite of the crown portion and has a rib with an increased thickness at its lower end. At least one of the pin boss bridges has a generally flat counter-bore surface for providing a reference location for machining of the piston body.

6 Claims, 3 Drawing Sheets

(56) References Cited

U.S. PATENT DOCUMENTS

| | | | |
|---|---|---|---|
| 8,220,432 B2 * | 7/2012 | Iwata | F02F 3/00 123/193.6 |
| 2003/0075137 A1 * | 4/2003 | Gaiser | F02F 3/00 123/193.6 |
| 2003/0188633 A1 | 10/2003 | Griffiths et al. | |
| 2008/0216790 A1 | 9/2008 | Breidenbach et al. | |
| 2010/0229820 A1 | 9/2010 | Iwata et al. | |
| 2011/0120299 A1 | 5/2011 | Aro | |
| 2012/0260882 A1 * | 10/2012 | Martins | B23B 1/00 123/193.6 |

FOREIGN PATENT DOCUMENTS

| | | |
|---|---|---|
| CN | 101263294 A | 9/2008 |
| CN | 101839187 A | 9/2010 |
| CN | 102155325 A | 8/2011 |

* cited by examiner

STEEL PISTON WITH COUNTER-BORE DESIGN

CROSS-REFERENCE TO RELATED APPLICATION

This application claims the benefit of U.S. Provisional Application Ser. No. 61/702,549, filed Sep. 18, 2012, and U.S. Utility application Ser. No. 14/030,530, filed Sep. 18, 2013, both of which are incorporated herein by reference in their entirety.

BACKGROUND OF THE INVENTION

1. Field of the Invention

The present invention relates generally to steel pistons and to methods of forming steel pistons.

2. Related Art

Many conventional monobloc piston bodies are made of Aluminum and include a crown portion, a pair of skirt portions, a pair of pin bosses and a plurality of pin boss bridges which extend between the skirt portions and the pin bosses. Such monobloc piston bodies are typically initially formed to a rough shape through a casting or forging process and subsequently machined to their final shapes. The machining operations usually start by locating a datum or reference point on an as-cast or as-forged feature on the piston and machining an inner portion of a lower end (but not the entire lower end) of each piston skirt to present a counter-bore with a generally flat surface. Once these counter-bores are formed, they are used as reference and/or datum points for many, if not all, of the subsequent machining processes to the piston body and also for final inspection of the piston body to ensure that the piston body can perform its intended function.

Many modern engine manufacturers employ advanced technologies, such as direct injection and turbo-charging to improve performance and fuel economy. As a consequence, these and other advanced technologies often result in increased combustion temperatures and pressures which could damage Aluminum pistons. To resist these increased combustion temperatures and pressures, some piston manufacturers have taken to manufacturing pistons of steel rather than Aluminum. Because of the increased strength of steel as compared to Aluminum, it is desirable to form pistons with thinner skirt and pin boss bridge wall thicknesses for weight reduction purposes. However, any reduction in the wall thickness of the skirt typically has the negative effect of reducing the material from which to machine the counter-bore surfaces, thereby making certain machining operations more difficult. Some piston manufacturers have attempted to machine counter-bore surfaces into skirts with reduced wall thicknesses. Such a piston body with counter-bore surfaces machined into its skirts is shown in FIGS. 1 and 2. However, this approach may result in outer, non-machined portions which are extremely thin, brittle and razor-sharp and could cause be easily damaged during the subsequent machining operations or during handling prior to or after the machining operations. In order to avoid these drawbacks, some manufacturers produce steel pistons with skirts that are thicker than is structurally necessary just to provide the skirts with enough thickness from which to machine the counter-bore surfaces without creating thin, brittle and sharp outer, non-machined surfaces on the skirts.

SUMMARY OF THE INVENTION

One aspect of the present invention provides for a piston for an internal combustion engine. The piston includes a piston body which is made of steel. The piston body has a crown portion with an upper combustion surface, a pair of skirts which depend from the crown portion, a pair of pin bosses for receiving a wrist pin and a plurality of pin boss bridges which extend from the skirts to the pin bosses and extend axially to lower ends opposite of the crown portion. Each of the pin boss bridges has a rib with an increased thickness at its respective lower end. At least one of the pin boss bridges has a generally flat counter-bore surface for providing a reference location for machining the piston body.

Locating the counter-bore surfaces on the ribs at the lower ends of the pin boss bridges is advantageous for a number of reasons. For example, the total weight or mass of the piston body may be reduced as compared to other known steel pistons because the thicknesses of the skirts may be optimized since they do not have to be thick enough to have the counter-bore surface. Additionally, since the thickened regions (i.e. the ribs) of the pin boss bridges are localized to only the lower bridge ends of the pin boss bridges, the weight or mass added to the piston body by the ribs is very small, especially when compared to the weight or mass saved by optimizing the wall thicknesses of the skirts. As such, the piston body is lighter than other known steel piston bodies. This is beneficial because it provides for reduced material costs during manufacturing as well as improved performance of the internal combustion engine.

Another aspect of the present invention provides for a method of making a piston. The method includes the step of forming a piston body to a non-final shape having a crown portion, a pair of skirts, a pair of pin bosses and pin boss bridges which interconnect the skirts with the pin bosses. The method proceeds with the step of machining counter-bore surfaces into lower bridge ends of the pin boss bridges. The method continues with the step of referencing at least one of the counter-bore surfaces. The method proceeds with the step of referencing or locating at least one of the counter-bore surfaces. The method continues with the step of machining the piston body based off of the referenced counter-bore surface.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
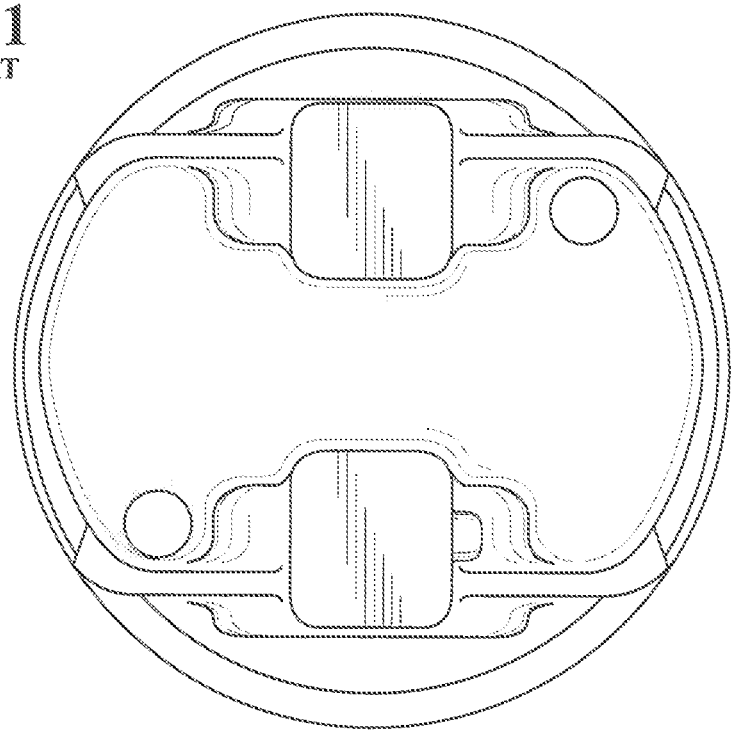
FIG. 1 is a bottom view of one known type of monoblock piston made of steel.
Figure 2:
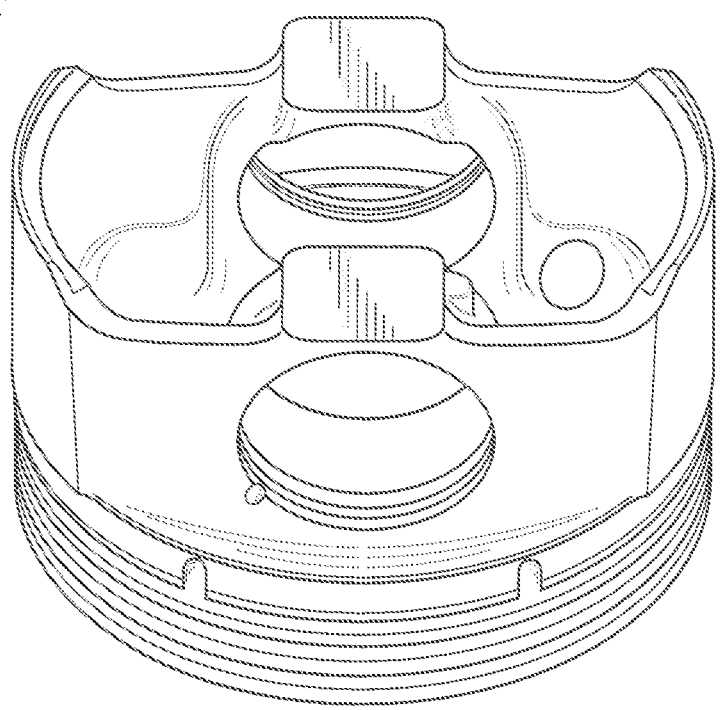
FIG. 2 is a perspective and elevation view of the conventional monoblock piston of FIG. 1.
Figure 3:
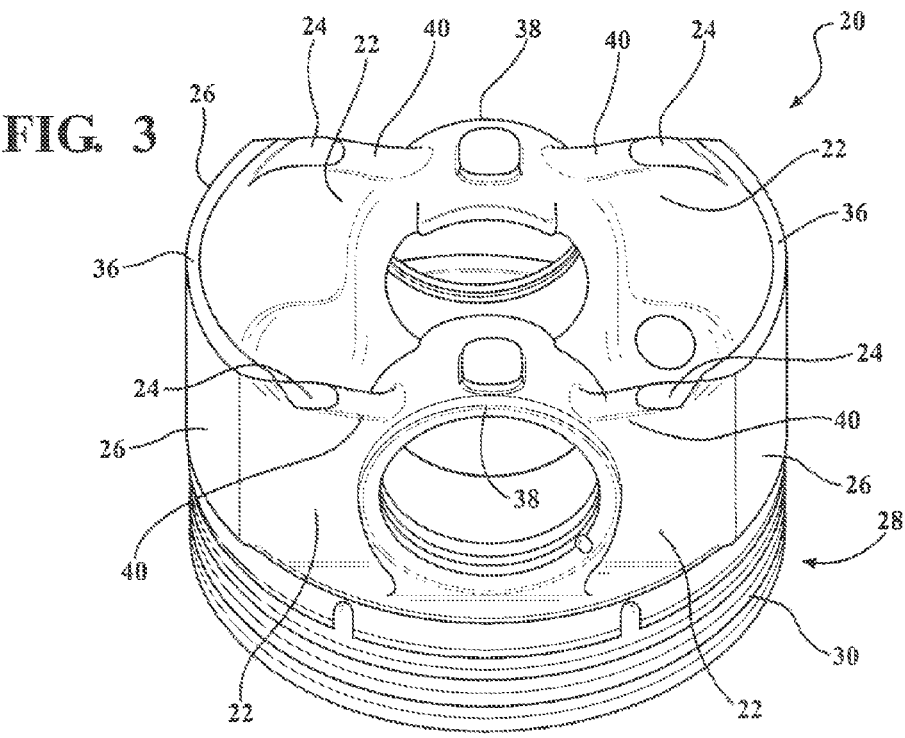
FIG. 3 is a perspective and elevation view of a piston constructed according to one aspect of the present invention.
Figure 4:
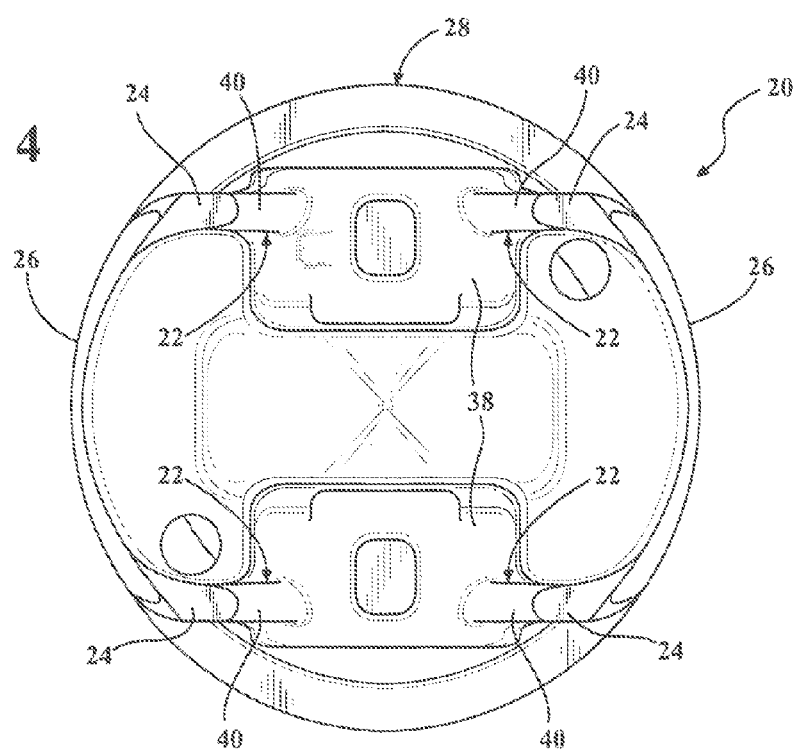
FIG. 4 is a bottom view of the piston of FIG. 3.
Figure 5:
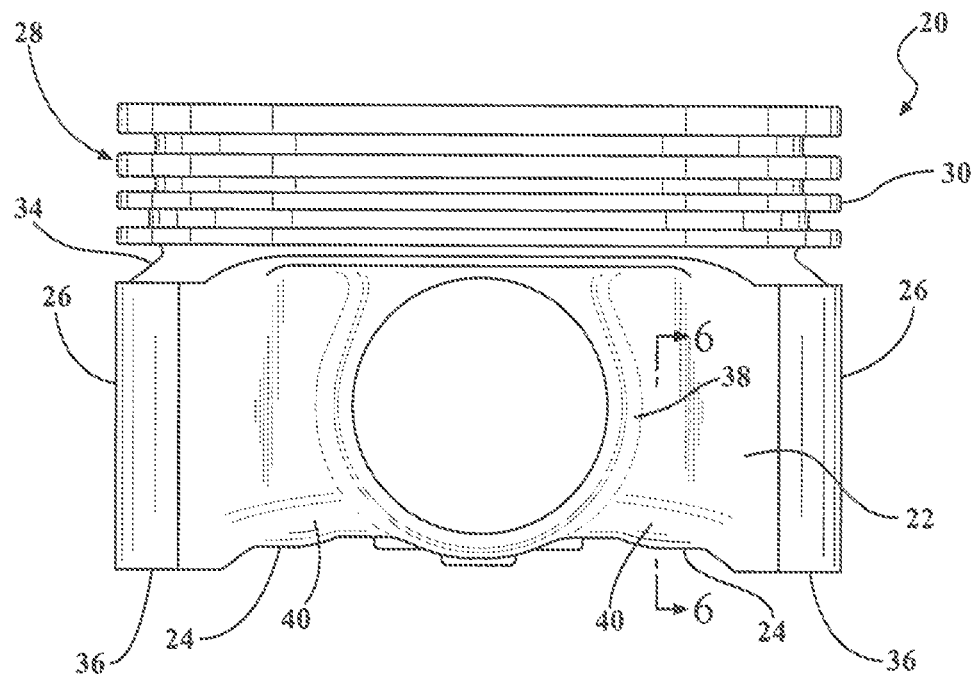
FIG. 5 is a side view of the piston of FIG. 3.
Figure 6:
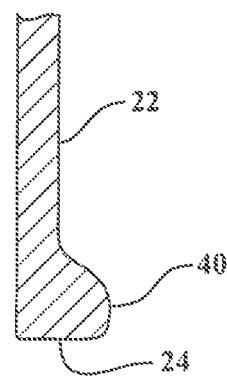
FIG. 6 is a cross-sectional and fragmentary view of a portion of the piston of FIG. 3 taken through line 6-6 of FIG. 5.

Referring to the Figures, wherein like numerals indicate corresponding parts throughout the several views, an exemplary embodiment of a monobloc piston body 20 for an internal combustion engine (not shown) is generally shown in FIGS. 3-5. The exemplary embodiment of the piston body 20 is made of steel and has a plurality of pin boss bridges 22 with generally flat counter-bore surfaces 24 which are machined into the pin boss bridges 22 after a casting and/or forging operation. The generally flat counter-bore surfaces 24 on the pin boss bridges 22 may be used as datum and/or reference locations for subsequent machining operations on the piston body 20. Additionally, because the generally flat counter-bore surfaces 24 are formed on the pin boss bridges 22 rather than on skirts 26 of the piston body 20, the skirts 26 may be formed with a reduced or optimized wall thickness as compared to other known piston bodies made of steel.

Referring now to FIG. 3, the piston body 20 of the exemplary embodiment includes a crown portion 28 with an upper combustion surface and a ring belt 30. The ring belt 30 includes a plurality of ring grooves that are recessed into an outer annular surface of the piston body 20 and spaced axially from one another for accommodating a plurality of piston rings (not shown). The upper ring grooves preferably are configured to accommodate compression rings (not shown) for sealing combustion gasses in the combustion chamber above the piston body 20, and lowest ring groove is preferably configured to accommodate an oil scrapper ring or ring set (not shown) for sealing a lubricating and cooling oil in a crankcase (not shown) and an oil pan (not shown) below the piston body 20. As best shown in FIG. 5, the piston body 20 is also formed with an oil drainage groove 34 which is spaced axially below the ring grooves and is configured to manage the flow of oil scrapped from a cylinder wall in the internal combustion engine to minimize the passage of oil beyond the piston rings. This oil drainage groove 34 extends around the outer surfaces of the skirts 26 and opens to the outer flattened faces of the pin boss bridges 22.

Referring back to FIG. 3, the skirts 26 of the piston body 20 are diametrically opposed from one another and depend from the crown portion 28 and extend in an axial direction from the crown portion 28 to respective lower skirt ends 36. Each of the skirts 26 may have a generally uniform wall thickness substantially its entire height from the crown portion 28 to its lower skirt end 36 or may have different thicknesses at different areas. The piston body 20 also includes a pair of diametrically opposed pin bosses 38 with openings which are aligned with one another for receiving a wrist pin (not shown) to connect the piston body 20 with a connecting rod (not shown) of the internal combustion engine. Each of the pin boss bridges 22 is integrally connected with and extends between one of the skirts 26 and one of the pin bosses 38. While the skirts 26 are rounded to correspond with the shapes of cylinder walls in the internal combustion engine, with the exceptions of the ribs 40 (discussed in further detail below), the pin boss bridges 22 are generally planar or flat.

In the exemplary embodiment of the piston body 20, the pin boss bridges 22 depend from the crown portion 28 and extend axially therefrom to respective lower bridge ends, and each of the pin boss bridges 22 has a rib 40 with an increased wall thickness at its respective lower bridge end, i.e., the lower bridge ends have a greater thickness than the other portions of the pin boss bridges 22. In the exemplary embodiment, the rib 40 of each pin boss bridge 22 extends substantially the entire distance between the respective skirt 26 and the respective pin boss 38. However, it should be appreciated that the piston body could alternately be formed with ribs that extend less than the entire distance between the respective skirts and the respective pin bosses.

Referring now to the bottom view of FIG. 4, the lower surfaces of the ribs 40 are machined to present a plurality of flat counter-bore surfaces 24 which may serve as reference and/or datum points/locations for subsequent machining processes on the piston body 20 and also for a final inspection process if applied. In the exemplary embodiment, the machined counter-bore surfaces 24 are located on the bottom surfaces of the pin boss bridges 22 on either side of the pin bosses 38, i.e., at all four of the transition areas where the pin boss bridges 22 meet the skirts 26. As shown, in the exemplary embodiment, the counter-bore surfaces 24 are raised vertically above the lower skirt ends 36 of the skirts 26, i.e., the counter-bore surfaces 24 are located axially (or vertically) between the lower skirt ends 36 and the crown portion 28 of the piston body 20.

The piston body 20 is preferably made of one integral piece of steel and is formed to a rough, non-final shape through a casting process or a forging process. After the casting or forging processes are completed, then the counter-bore surfaces 24 are machined into the ribs 40 of the pin boss bridges 22. Next, the counter-bore surfaces 24 are used as reference or datum locations for subsequent machining processes, e.g., machining openings in the pin bosses 38, machining the outside diameters of the piston body 20, machining the ring grooves 32 into the crown portion 28, and/or machining the upper combustion surface of the crown portion 28.

If the piston body 20 is formed to its rough, non-final shape through a casting process, then the ribs 40 at the lower bridge ends of the pin boss bridges 22 may be directly cast into the piston body 20. Alternately, if the piston body 20 is formed to its rough, non-final shape through a forging process, then the pin boss bridges 22 may initially be formed with a greater thickness and then machined either before or after the machining of the counter-bore surfaces 24 to their final thicknesses while leaving the thickened ribs 40 in the lower bridge ends of the pin boss bridges 22.

Locating the counter-bore surfaces 24 on the ribs 40 of the pin boss bridges 22 is advantageous for a number of reasons. For example, the total weight or mass of the piston body 20 may be reduced as compared to other known steel pistons because the thicknesses of the skirts 26 may be optimized since the counter-bore surfaces 24 are on the skirts 26. In addition to material savings, this may provide the internal combustion engine with improved performance. Additionally, since the thickened regions (i.e. the ribs 40) of the pin boss bridges 22 are localized to only the lower bridge ends of the pin boss bridges 22, the weight or mass added to the piston by the ribs 40 is very small, especially when compared to the weight or mass saved by optimizing the wall thicknesses of the skirts 26.

Another advantage of forming the counter-bore surfaces 24 into the lower bridge ends of the pin boss bridges 22 is that the embracement angle for centering the piston in a pin direction is maximized. After the counter-bore surfaces 24 are formed into the piston, a disc (not shown) is typically attached to the piston body 20 at the counter-bore surfaces 24, and this disc may be used for locating a reference datum point in the pin direction. Depending on a range of factors including pin length, in some pistons the lengths of the skirts may be very small, and therefore, the angles through which the counter-bore surfaces of other known piston bodies extends may be not be long enough to accurately locate the piston body in the pin direction in pistons having counter-bores formed the conventional way (i.e. on the bottom surfaces of the skirts). However, since the counter-bore surfaces 24 of the piston body 20 of the exemplary embodiment are formed in the bin boss bridges rather than the skirts 26, a wider angle between the opposite counter-bore surfaces 24 may be measured to more accurately locate the piston body 20 in the pin direction since the counter-bore surfaces 24 are formed adjacent (or possibly even past) the ends of the skirts 26.

Another aspect of the present invention provides for a method of making a piston for an internal combustion engine. An exemplary method includes the step of forming a piston body 20 to a non-final shape wherein the piston body 20 has a crown portion 28, a pair of skirts 26, a pair of pin bosses 38, and pin boss bridges 22 with ribs 40 interconnecting the skirts 26 with the pin bosses 38. The forming step may be, for example, casting the piston body 20 or forging the piston body 20. If the piston body 20 is cast to the non-final shape, then the ribs 40 may be directly cast into the piston body 20. On the other hand, if the piston body 20 is forged to the non-final shape, then the method may additionally include the step of machining the pin boss bridges 22 to present the ribs 40.

The exemplary method proceeds with the step of machining counter-bore surfaces 24 into lower bridge ends of the pin boss bridges 22. The exemplary method then continues with the step of referencing (for example, with a CNC machine) at least one of the counter-bore surfaces 24 on at least one of the pin boss bridges 22. The method then proceeds with the step of machining the piston body 20 based off of the referenced counter-bore surface 24 or surfaces on at least one pin boss bridge 22. The machining of the piston body 20 based off of the referenced counter-bore surface 24 or surfaces could be, for example, machining ring grooves into the crown portion 28, machining the outside diameters of the piston body 20, machining openings in the pin bosses 38 or machining an upper combustion surface of the crown portion 28.

Obviously, many modifications and variations of the present invention are possible in light of the above teachings and may be practiced otherwise than as specifically described while within the scope of the appended claims.

What is claimed is:

1. A method of making a piston, comprising the steps of:
   forming a piston body to a non-final shape having a crown portion, a pair of skirts, a pair of pin bosses, and pin boss bridges interconnecting the skirts with the pin bosses;
   machining counter-bore surfaces into lower bridge ends of the pin boss bridges;
   referencing at least one of the counter-bore surfaces; and
   machining the piston body based off of the referenced counter-bore surface.

2. The method as set forth in claim 1 wherein the piston body has ribs at the lower bridge ends of the pin boss bridges after the forming step.

3. The method as set forth in claim 2 wherein the forming step is further defined as casting the piston body to the non-final shape.

4. The method as set forth in claim 2 wherein the forming step is further defined as forging the piston body to the non-final shape.

5. The method as set forth in claim 4 further including the step of machining the ribs into the lower bridge ends of the pin boss bridges.

6. The method as set forth in claim 1 wherein the forming step is further defined as forging the piston body to the non-final shape.

* * * * *